United States Patent
Wei et al.

(10) Patent No.: US 10,366,294 B2
(45) Date of Patent: Jul. 30, 2019

(54) TRANSPARENCY-CHARACTERISTIC BASED OBJECT CLASSIFICATION FOR AUTOMATED VEHICLE

(71) Applicant: Aptiv Technologies Limited, St. Michael (BB)

(72) Inventors: Junqing Wei, Bridgeville, PA (US); Wenda Xu, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 15/467,037

(22) Filed: Mar. 23, 2017

(65) Prior Publication Data
US 2018/0276484 A1 Sep. 27, 2018

(51) Int. Cl.
| | |
|---|---|
| G06K 9/00 | (2006.01) |
| G05D 1/00 | (2006.01) |
| G05D 1/02 | (2006.01) |
| G08G 1/16 | (2006.01) |
| G06K 9/46 | (2006.01) |
| G06K 9/62 | (2006.01) |
| G01S 17/08 | (2006.01) |

(Continued)

(52) U.S. Cl.
CPC ............ G06K 9/00805 (2013.01); G01S 7/40 (2013.01); G01S 13/93 (2013.01); G01S 13/931 (2013.01); G01S 17/02 (2013.01); G01S 17/023 (2013.01); G01S 17/08 (2013.01); G01S 17/87 (2013.01); G01S 17/93 (2013.01); G01S 17/936 (2013.01); G05D 1/0088 (2013.01); G05D 1/0248 (2013.01); G06K 9/4604 (2013.01); G06K 9/4652 (2013.01); G06K 9/627 (2013.01); G08G 1/16 (2013.01); G01S 2007/4039 (2013.01); G01S 2013/9375 (2013.01); G01S 2013/9378 (2013.01); G01S 2013/9382 (2013.01)

(58) Field of Classification Search
None
See application file for complete search history.

(56) References Cited

U.S. PATENT DOCUMENTS

| | | |
|---|---|---|
| 2006/0282218 A1 | 12/2006 | Urai et al. |
| 2007/0288133 A1 | 12/2007 | Nishira et al. |

(Continued)

OTHER PUBLICATIONS

European Extended Search Report in European Application No. 18161586, dated Aug. 30, 2018, 7 pages.

(Continued)

Primary Examiner — Stephen P Coleman
(74) Attorney, Agent, or Firm — Fish & Richardson P.C.

(57) ABSTRACT

An object classification system for an automated vehicle includes a lidar and/or a camera, and a controller. The controller determines a lidar-outline and/or a camera-outline of an object. Using the lidar, the controller determines a transparency-characteristic of the object based on instances of spot-distances from within the lidar-outline of the object that correspond to a backdrop-distance. Using the camera, the controller determines a transparency-characteristic of the object based on instances of pixel-color within the camera-outline that correspond to a backdrop-color. The transparency-characteristic may also be determined based on a combination of information from the lidar and the camera. The controller operates the host-vehicle to avoid the object when the transparency-characteristic is less than a transparency-threshold.

18 Claims, 3 Drawing Sheets

(51) Int. Cl.
　　　*G01S 17/02*　　(2006.01)
　　　*G01S 17/87*　　(2006.01)
　　　*G01S 17/93*　　(2006.01)
　　　*G01S 7/40*　　(2006.01)
　　　*G01S 13/93*　　(2006.01)

(56) References Cited

U.S. PATENT DOCUMENTS

2010/0106356 A1　4/2010　Trepagnier et al.
2012/0044093 A1　2/2012　Pala

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference dated Sep. 28, 2018, pp. 1164-1171.

TRANSPARENCY-CHARACTERISTIC BASED OBJECT CLASSIFICATION FOR AUTOMATED VEHICLE

TECHNICAL FIELD OF INVENTION

This disclosure generally relates to an object classification system, and more particularly relates to a system that determines a transparency-characteristic of an object and operates a host-vehicle to avoid the object, if possible, when the transparency-characteristic is less than a transparency-threshold.

BACKGROUND OF INVENTION

It is known to equip an automated vehicle to detect an object in the travel-path of the automated vehicle. Normally, the automated-vehicle will take various actions to avoid running over most objects. However, in some circumstances such as during high-speed travel on a crowded roadway, it may be preferable to run-over an object such as tumbleweed rather than perform an abrupt braking and/or lane-change maneuver to avoid hitting the tumbleweed.

SUMMARY OF THE INVENTION

In accordance with one embodiment, an object classification system for an automated vehicle is provided. The system includes a lidar and a controller. The lidar is mounted on a host-vehicle. The lidar determines spot-distances indicated by light-beams that were emitted by the lidar and reflected toward the lidar from an area proximate to the host-vehicle. The controller is in communication with the lidar. The controller determines a lidar-outline of an object in the area based on spot-distances, determines an object-distance to the object based on spot-distances within the lidar-outline of the object, determines a backdrop-distance to a backdrop based on spot-distances outside of the lidar-outline of the object, determines a transparency-characteristic of the object based on instances of spot-distances from within the lidar-outline of the object that correspond to the backdrop-distance, and operates the host-vehicle to avoid the object when the transparency-characteristic is less than a transparency-threshold.

In another embodiment, an object classification system for an automated vehicle is provided. The system includes a camera and a controller. The camera is mounted on a host-vehicle. The camera renders an image of an area proximate to the host-vehicle. The image is based on light detected by a plurality of pixels in the camera, where each pixel detects a pixel-color of light from the area. The controller is in communication with the camera. The controller determines a camera-outline of an object based on the image, determines a backdrop-color of a backdrop outside of the camera-outline of the object, determines a transparency-characteristic of the object based on instances of pixel-color within the camera-outline that correspond to the backdrop-color, and operates the host-vehicle to avoid the object when the transparency-characteristic is less than a transparency-threshold.

In another embodiment, an object classification system for an automated vehicle is provided. The system includes a lidar, a camera, and a controller. The controller is in communication with the lidar and the camera. The controller determines a transparency-characteristic of an object using a combination of the aforementioned steps with regard to the lidar and the camera.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
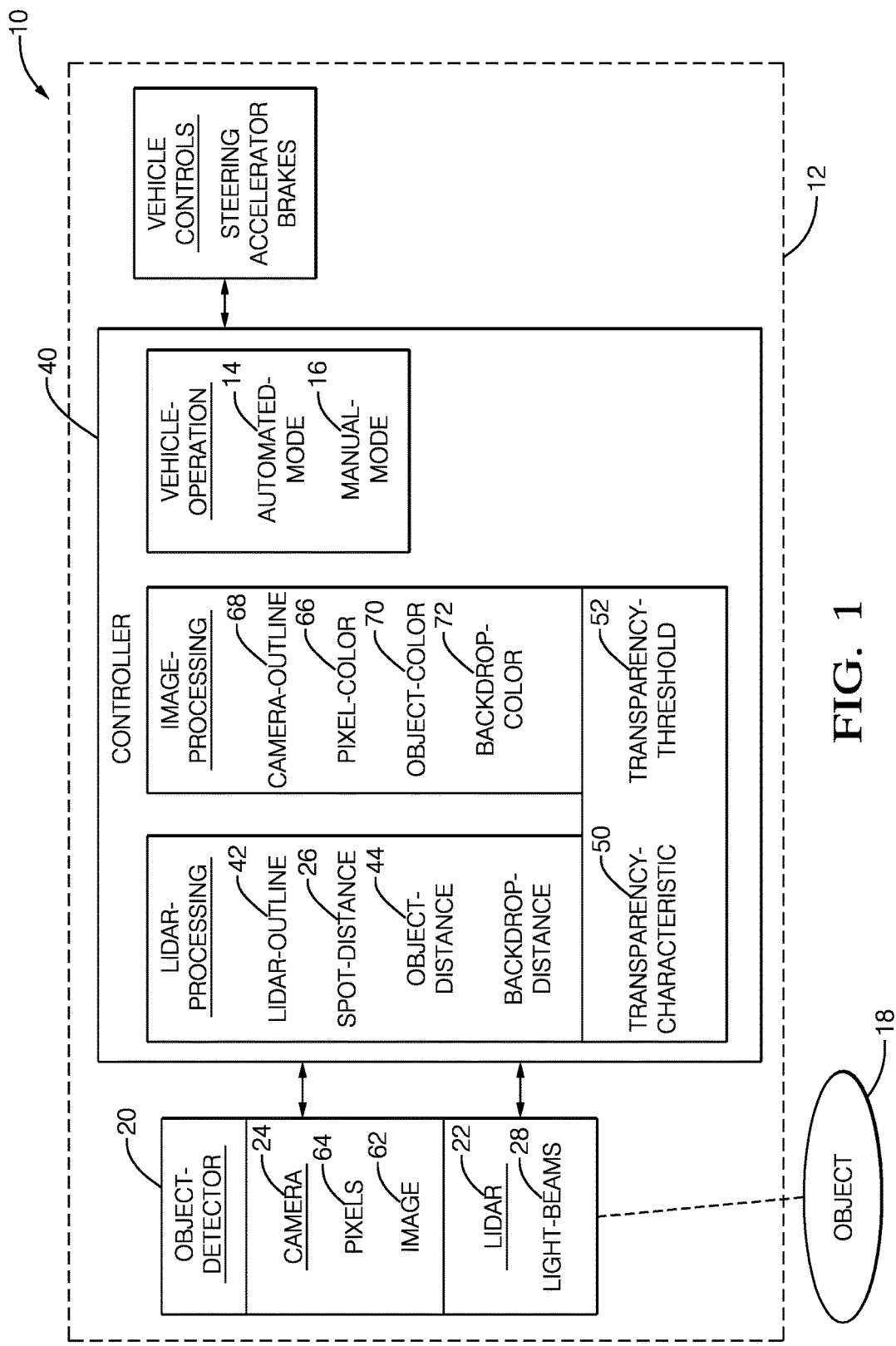
FIG. 1 is a diagram of object classification system in accordance with one embodiment.

FIG. 1 illustrates a non-limiting example of an object classification system 10, hereafter referred to as the system 10, which is suitable for use on an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or brake to avoid a collision with an object 18.

The system 10 includes an object-detector 20 that may include a lidar 22 and/or a camera 24, where either or both are preferably mounted on the host-vehicle 12. While FIG. 1 may be interpreted to mean that the lidar 22 and the camera 24 are part of a unified assembly, this is not a requirement. That is, the lidar 22 and the camera 24 may be mounted at distinct spaced-apart locations on the host-vehicle 12. It is also contemplated that the host-vehicle 12 may be equipped with multiple instances of the lidar 22 and/or the camera 24. That is, the fact that the following discussion only considers that the host-vehicle 12 is equipped with one instance of the lidar 22 and/or one instance of the camera 24 does not restrict the system 10 from being equipped with multiple instances of either device.

Figure 2:
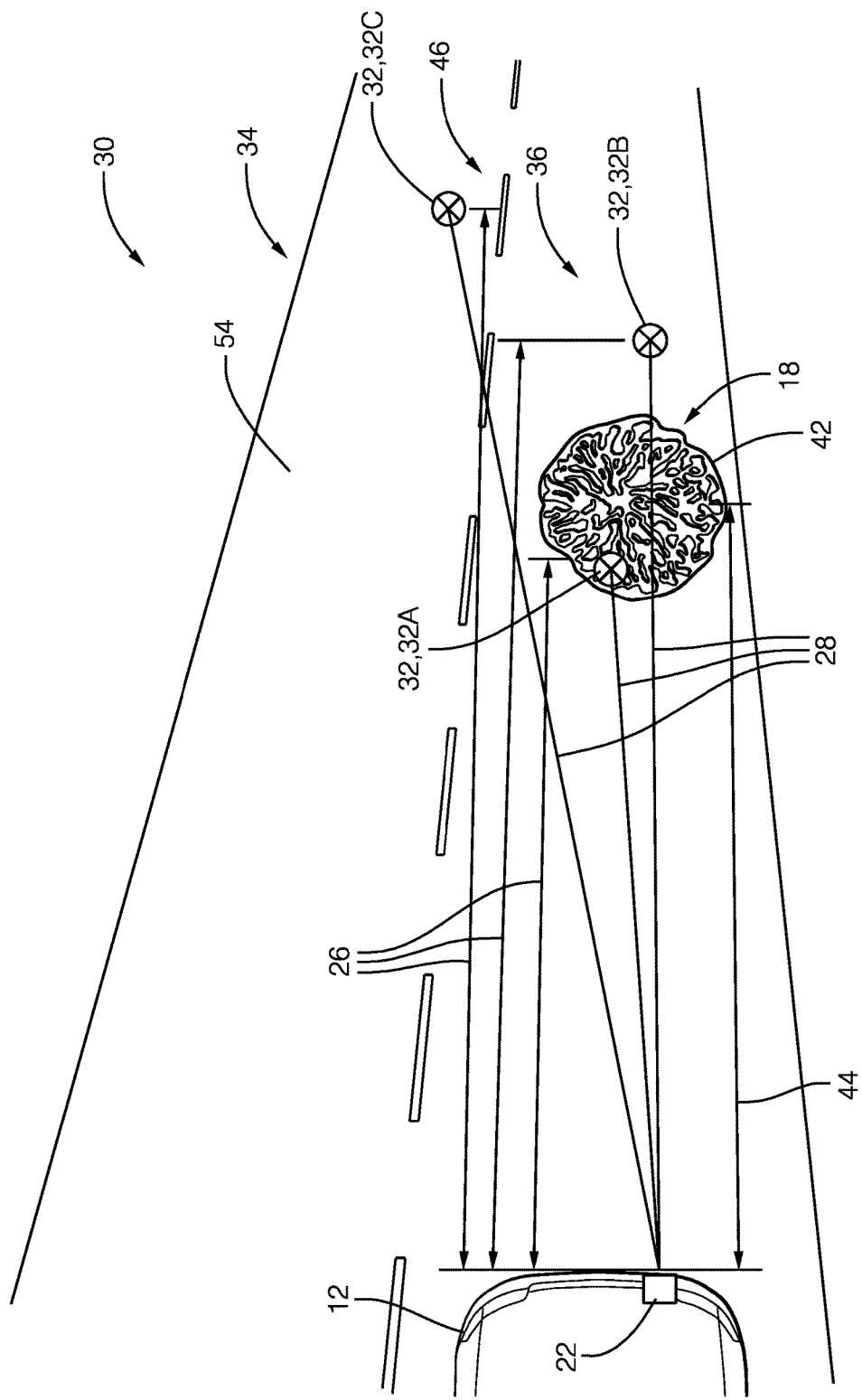
FIG. 2 is an illustration of a scenario encountered by the system of FIG. 1 in accordance with one embodiment.

FIG. 2 illustrates a non-limiting example of a scenario 30 that the host-vehicle 12 may encounter. The lidar 22 determines or is used to determine instances of spot-distances 26 to spots 32 illuminated by the light-beams in an area 34 proximate to, i.e. forward of and within one-hundred meters (100 m) of the host-vehicle 12. That is, the spot-distances 26 are indicated by light-beams 28, which are typically infrared-light and were emitted by a laser-source (not shown) the lidar 22 and reflected toward the lidar 22 from the area 34 proximate to the host-vehicle 12. By way of example and not limitation, the object 18 illustrated in FIG. 2 is a tumbleweed, which is a structural part of the above-ground anatomy of a number of species of plants that, once it is mature and dry, detaches from its root or stem, and tumbles away in the wind. As shown, the light-beams 28 may illuminate a spot 32A on the object 18, or may pass through the object 18 and illuminate a spot 32B on a roadway 36 behind (relative to the host-vehicle 12) the object 18

The system 10 may include a controller 40 (FIG. 1) in communication with the lidar 22 and/or the camera 24, whichever is provided. The controller 40 may include a processor (not specifically shown) such as a microprocessor or other control circuitry such as analog and/or digital control circuitry including an application specific integrated circuit (ASIC) for processing data as should be evident to those in the art. The controller 40 may include memory (not specifically shown), including non-volatile memory, such as electrically erasable programmable read-only memory (EEPROM) for storing one or more routines, thresholds, and captured data. The one or more routines may be executed by the processor to perform steps for classifying the object 18 based on signals received by the controller 40 from the lidar 22 and/or the camera 24 as described herein.

In an embodiment of the system 10 that includes the lidar 22, the controller 40 determines (i.e. the controller 40 is configured to or programed to determine) a lidar-outline 42 of the object 18 in the area 34 based on the spot-distances 26. Those familiar with the operation of lidars will recognize that the object 18 will be illuminated with many more instances of the light-beams 28 than the two illustrated in FIG. 2. That FIG. 2 shows only two instances of the light-beams 28 is done only to simplify the illustration. The spot-distances 26 that are similar will be grouped together so that the controller 40 is able to determine the lidar-outline 42 of the object 18. While FIG. 2 may be interpreted as suggesting that the lidar 22 is a three-dimensional lidar that indicates both an azimuth-angle (side-to-side or left/right) and an elevation-angle (up/down) for each of the spots 32, this is not a requirement. The teachings presented herein are applicable to systems that use two-dimensional lidars that only indicate an azimuth-angle of the spots 32. Those in the art will recognize that the lidar-outline 42 for a two-dimensional lidar may merely be a left and right boundary rather than a line that encloses the object 18 as shown in FIG. 2.

The controller 40 then determines an object-distance 44 to the object 18 from the host-vehicle 12 based on spot-distances 26 within the lidar-outline 42 of the object 18. If some of the light-beams 28 pass completely through the object 18, as could be the case when the object 18 is a tumbleweed, and illuminate a backdrop 46 behind the object 18 (relative to the host-vehicle 12), the spot-distances 26 to those spots, e.g. the spot 32B, will be distinguishable from the spots 32 on the object 18, e.g. the spot 32A. In other words, the spot-distances 26 from within the lidar-outline 42 will be noisy, i.e. be highly variable, because some of the light-beams 28 passed through the object 18 so are not reflected by the object 18. If the lidar 22 is mounted on the host-vehicle 12 relatively close to the surface of the roadway 36 so the light-beams 28 are substantially parallel to the surface of the roadway 36, the spot 32B may be much more far-removed from the object 18 than is suggested by FIG. 2. Indeed, the spot 32B may be so far-removed that no reflection of the light-beam is detected when the light-beam passes through the object 18. That is, the backdrop 46 may be the sky or a horizon that is beyond the detection range of the lidar 22.

The controller 40 then determines a backdrop-distance 48 to the backdrop 46 based on the spot-distances 26 to spots 32 outside of the lidar-outline 42 of the object 18, e.g. the distance to spot 32C. If the roadway 36 curves upward relative to the host-vehicle 12, the backdrop-distance 48 may correspond to the distance to the spot 32C on the roadway 36. However, if the roadway 36 curves downward, or is level and the lidar 22 is located close to surface of the roadway 36, the backdrop-distance 48 may be infinity because the backdrop 46 is the sky.

The controller 40 then determines a transparency-characteristic 50 of the object based on instances of the spot-distances 26 from within the lidar-outline 42 of the object 18 that correspond to the backdrop-distance 48. In other words, the transparency-characteristic 50 is an indication of how many or what percentage of the light-beams 28 that are directed toward the object 18 (i.e. inside the lidar-outline 42) end up passing through the object 18 and thereby indicate the backdrop-distance 48 rather than the a distance comparable to the object-distance 44.

The controller 40 may then operate the host-vehicle 12 to avoid the object 18 when the transparency-characteristic 50 is less than a transparency-threshold 52. The transparency-threshold may be fifty-five percent (55%) for example, however it is contemplated that empirical testing may be needed for various configurations of the lidar 22 and testing of various example of the object 18 that can be run-over by the host-vehicle 12 is necessary. If the transparency-characteristic 50 is greater than the transparency-threshold 52, then it is presumed that the object 18 is, for example, a tumbleweed or something that could be run-over by the host-vehicle 12 without causing excessive damage to the host-vehicle 12 if the actions necessary to avoid the object 18 are not preferable. For example, if the host-vehicle 12 is being followed at close range (e.g. less than 25 m) by a following-vehicle (not shown), then sudden braking by the host-vehicle 12 may be ill-advised. Similarly, if there is an approaching-vehicle (not shown) traveling in the on-coming lane 54, then it may be ill-advised for the host-vehicle 12 to swerve into the on-coming lane 54 to avoid running-over the object 18.

Figure 3:
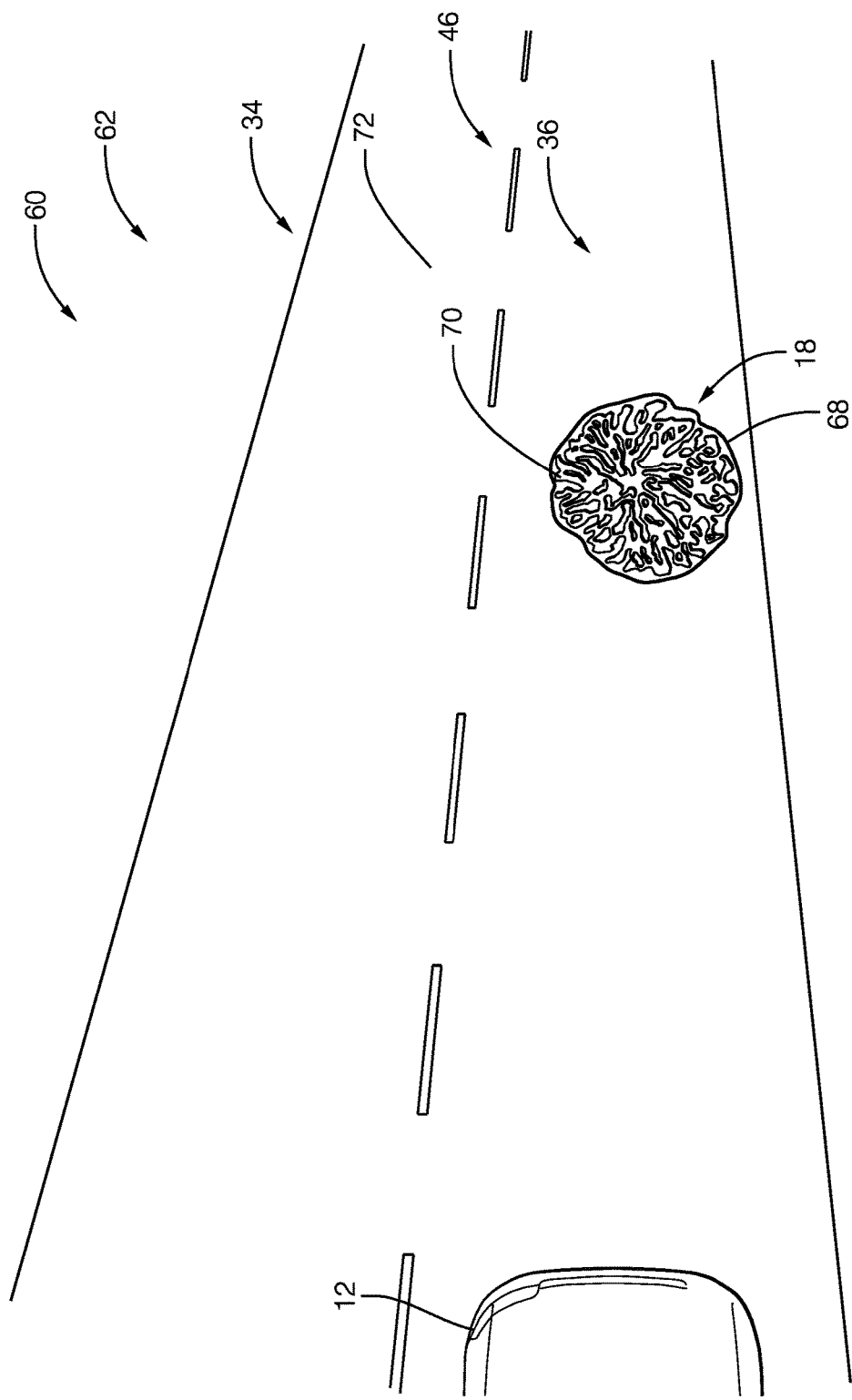
FIG. 3 is an illustration of a scenario encountered by the system of FIG. 1 in accordance with one embodiment.

FIG. 3 illustrates a non-limiting example of a scenario 60 that is similar to the scenario 30 of FIG. 2 and that the host-vehicle 12 may encounter. The camera renders an image 62 of the area 34 proximate to the host-vehicle 12, e.g. forward of and in the line-of-site from the host-vehicle 12. The image 62 is based on light detected by a plurality of pixels 64 in the camera 24, where each pixel detects a pixel-color 66 of light from the area 34, as will be recognized by those in the art. While the camera 24 could be a black and white type camera, a color camera is preferable as it makes it easier to distinguish parts of the object 18 from the backdrop 46.

When the system 10 is equipped with the camera 24, either with or without the lidar 22, the controller 40 determines a camera-outline 68 of the object 18 based on the image 62. For example, the portion of the pixels 64 that have an object-color 70 that is distinct from a backdrop-color 72 of the backdrop 46 outside of the camera-outline 68 of the object 18. For example, if the object 18 is a tumbleweed, then the object-color 70 may be tan or light-brown. In contrast, if the back-drop is the roadway 36 then the backdrop-color may be dark-grey, e.g. the color of asphalt. In further contrast, if the backdrop 46 is the sky, then the backdrop-color may be blue or white or grey depending on the weather conditions.

The controller 40 then determines the transparency-characteristic 50 of the object 18 based on, for example, a percentage of instances of the pixel-color 66 within the camera-outline 68 that correspond to the backdrop-color 72. In other words, if the object 18 is relatively transparent as is the case for a typical example of a tumbleweed, then the backdrop-color 72 would be detected in the image 62 inside of the camera-outline 68. As described above, the controller 40 may operate the host-vehicle 12 to avoid the object 18 when the transparency-characteristic 50 is less than the transparency-threshold 52.

If the system 10 is equipped with both the lidar 22 and the camera 24, the decision to operate the host-vehicle 12 to avoid the object 18 may be based on either data from the lidar 22 or the camera 24 indicating that the transparency-characteristic 50 is less than the transparency-threshold 52, or both the lidar 22 or the camera 24 indicating that the transparency-characteristic 50 is less than the transparency-threshold 52. It is contemplated that empirical testing for various configurations of the lidar 22 and the camera 24 will yield which decision rules are preferable.

Accordingly, an object classification system (the system 10), a controller 40 for the system 10, and a method of operating the system 10 is provided. The transparency-characteristic 50 of the object 18 may be just one of several characteristics that could be considered in combination to determine if the object 18 can be, if necessary, run-over by the host-vehicle 12 without causing excessive damage to the host-vehicle 12, where the necessity to do so may be determined by the presence of other vehicles proximate to the host-vehicle 12.

While this invention has been described in terms of the preferred embodiments thereof, it is not intended to be so limited, but rather only to the extent set forth in the claims that follow.

We claim:

1. An object classification system for an automated vehicle, said system comprising:
    a lidar mounted on a host-vehicle, said lidar determines spot-distances indicated by light-beams that were emitted by the lidar and reflected toward the lidar from an area proximate to the host-vehicle;
    a controller in communication with the lidar, wherein the controller
        determines a lidar-outline of an object in the area based on spot-distances,
        determines an object-distance to the object based on spot-distances within the lidar-outline of the object,
        determines a backdrop-distance to a backdrop based on spot-distances outside of the lidar-outline of the object,
        determines a transparency-characteristic of the object based on instances of spot-distances from within the lidar-outline of the object that correspond to the backdrop-distance, and
        operates the host-vehicle to avoid the object when the transparency-characteristic is less than a transparency-threshold.

2. The system of claim 1, wherein the automated vehicle has a level of automation, and the level of automation for the automated vehicle is providing a warning to a human-operator for the automated vehicle.

3. The system of claim 1, wherein the lidar is a two-dimensional lidar and the two-dimensional lidar is configured to indicate an azimuth-angle for each of the spots.

4. The system of claim 1, wherein the controller further:
    determines that the transparency-characteristic is over the transparency-threshold; and
    in response, operates the host-vehicle to run over or through the object.

5. The system in accordance with claim 1, wherein the system further includes
    a camera mounted on the host-vehicle and in communication with the controller, said camera renders an image based on light detected by a plurality of pixels in the camera, wherein each pixel detects a pixel-color of light from the area, wherein the controller
        determines a camera-outline of the object based on the image,
        determines a backdrop-color of the backdrop outside of the camera-outline of the object, and
        further determines the transparency-characteristic of the object based on instances of pixel-color within the camera-outline that correspond to the backdrop-color.

6. The system of claim 5, wherein the controller operates the host-vehicle to avoid the object when the second transparency-characteristic is less than the transparency-threshold.

7. The system of claim 5, wherein the controller operates the host-vehicle to avoid the object when both the transparency-characteristic and the second transparency-characteristic are below the transparency-threshold.

8. A method comprising:
    determining, by a lidar mounted on an automated vehicle, respective spot-distances indicated by one or more spots, wherein the one or more spots are locations in an area proximate to the automated vehicle where light-beams emitted by the lidar are reflected toward the lidar;
    determining a lidar-outline of an object in the area based on the spot-distances;
    determining an object-distance to the object based on the spot-distances within the lidar-outline of the object;
    determining a backdrop-distance to a backdrop based on the spot-distances outside of the lidar-outline of the object;
    determining a transparency-characteristic of the object based on instances of spot-distances from within the lidar-outline of the object that correspond to the backdrop-distance; and
    operating the automated vehicle to avoid the object when the transparency-characteristic is less than a transparency-threshold.

9. The method of claim 8, further comprising:
    determining, by a camera mounted on the automated vehicle, a camera-outline of the object based on the image;
    determining a backdrop-color of the backdrop outside of the camera-outline of the object; and
    determining a second transparency-characteristic of the object based on instances of pixel-color within the camera-outline that correspond to the backdrop-color.

10. The method of claim 9, wherein operating the automated vehicle to avoid the object comprises:
    determining that the second transparency-characteristic is less than the transparency-threshold; and
    in response, operating the automated vehicle to avoid the object.

11. The system of claim 9, wherein operating the automated vehicle to avoid the object comprises:
    determining that both the transparency-characteristic and the second transparency-characteristic are below the transparency-threshold; and
    in response, operating the automated vehicle to avoid the object.

12. A non-transitory computer-readable storage medium comprising a plurality of instructions for object classification for an automated vehicle, the plurality of instructions configured to execute on at least one computer processor to enable the computer processor to:

determine, by a lidar mounted on the automated vehicle, respective spot-distances indicated by one or more spots, wherein the one or more spots are locations in an area proximate to the automated vehicle where light-beams emitted by the lidar are reflected toward the lidar;

determine a lidar-outline of an object in the area based on the spot-distances;

determine an object-distance to the object based on the spot-distances within the lidar-outline of the object;

determine a backdrop-distance to a backdrop based on the spot-distances outside of the lidar-outline of the object;

determine a transparency-characteristic of the object based on instances of spot-distances from within the lidar-outline of the object that correspond to the backdrop-distance; and operate the automated vehicle to avoid the object when the transparency-characteristic is less than a transparency-threshold.

13. An object classification system for an automated vehicle, the system comprising:

a camera mounted on the automated vehicle, the camera renders an image of an area proximate to the automated vehicle, the image based on light detected by a plurality of pixels in the camera, wherein each pixel detects a pixel-color of light from the area; and a controller in communication with the camera, wherein the controller:

determines a camera-outline of an object based on the image;

determines a backdrop-color of a backdrop outside of the camera-outline of the object;

determines a transparency-characteristic of the object based on instances of pixel-color within the camera-outline that correspond to the backdrop-color; and operates the automated vehicle to avoid the object when the transparency-characteristic is less than a transparency-threshold.

14. The object classification system of claim 13, wherein the image rendered by the camera is rendered in black and white.

15. The system of claim 13, wherein the automated vehicle has a level of automation, and the level of automation for the automated vehicle is providing a warning to a human-operator for the automated vehicle.

16. The system of claim 13, wherein the controller further:

determines that the transparency-characteristic is over the transparency-threshold; and in response, operates the automated vehicle to run over or through the object.

17. A method comprising:

rendering, by a camera mounted on an automated vehicle, an image of an area proximate to the automated vehicle, the image based on light detected by a plurality of pixels in the camera, wherein each pixel detects a pixel-color of light from the area;

determining a camera-outline of an object based on the image;

determining a backdrop-color of a backdrop outside of the camera-outline of the object;

determining a transparency-characteristic of the object based on instances of pixel-color within the camera-outline that correspond to the backdrop-color; and operating the automated vehicle to avoid the object when the transparency-characteristic is less than a transparency-threshold.

18. A non-transitory computer-readable storage medium comprising a plurality of instructions for object classification for an automated vehicle, the plurality of instructions configured to execute on at least one computer processor to enable the computer processor to:

render, by a camera mounted on the automated vehicle, an image of an area proximate to the automated vehicle, the image based on light detected by a plurality of pixels in the camera, wherein each pixel detects a pixel-color of light from the area;

determine a camera-outline of an object based on the image;

determine a backdrop-color of a backdrop outside of the camera-outline of the object;

determine a transparency-characteristic of the object based on instances of pixel-color within the camera-outline that correspond to the backdrop-color; and operate the automated vehicle to avoid the object when the transparency-characteristic is less than a transparency-threshold.

* * * * *